United States Patent
Ishikawa et al.

(10) Patent No.: US 9,563,471 B2
(45) Date of Patent: Feb. 7, 2017

(54) SIMULATION APPARATUS, SIMULATION METHOD, AND PROGRAM

(71) Applicant: International Business Machines Corporation, Armonk, NY (US)

(72) Inventors: Tatsuya Ishikawa, Tokyo (JP); Asim Munawar, Ichikawa (JP); Shuichi Shimizu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 14/551,174

(22) Filed: Nov. 24, 2014

(65) Prior Publication Data
US 2015/0149145 A1 May 28, 2015

(30) Foreign Application Priority Data
Nov. 28, 2013 (JP) ................................ 2013-246498

(51) Int. Cl.
*G06F 17/50* (2006.01)
*G06F 9/48* (2006.01)

(52) U.S. Cl.
CPC .................. *G06F 9/4881* (2013.01)

(58) Field of Classification Search
CPC . G06F 17/5022; G06F 17/5031; G06F 9/4881
USPC ........................ 703/13, 16, 19, 21
See application file for complete search history.

(56) References Cited

U.S. PATENT DOCUMENTS

| 5,794,005 A | 8/1998 | Steinman | |
|---|---|---|---|
| 2004/0024578 A1* | 2/2004 | Szymanski | G06F 17/5009 703/17 |
| 2013/0124174 A1* | 5/2013 | Jefferson | B64G 3/00 703/6 |

(Continued)

FOREIGN PATENT DOCUMENTS

| JP | 2010002968 A | 1/2010 |
|---|---|---|
| JP | 2010033130 A | 2/2010 |

(Continued)

OTHER PUBLICATIONS

Thoppian et al. "Improving Performance of Parallel Simulation Kernel for Wireless Network Simulations". 2006. IEEE. 6 pages.*

(Continued)

*Primary Examiner* — Eunhee Kim
(74) *Attorney, Agent, or Firm* — Mark G. Edwards

(57) ABSTRACT

A simulation apparatus that performs parallel execution of multiple logical processes obtained by modeling a plurality of components included in a system to be simulated. The apparatus includes: (i) a condition generating unit configured to generate, on the basis of communication delays between the multiple logical processes, constraint conditions to be satisfied by initial time shifts given to the multiple logical processes and look-ahead times each to be permitted by a message sent from a logical process serving as a communication source to a logical process serving as a communication destination to permit look-ahead; and (ii) a solver unit configured to solve an optimization problem that satisfies the constraint conditions and minimizes overhead in communication of messages between the multiple logical processes, and obtain the initial time shifts of the multiple logical processes and the look-ahead times between the multiple logical processes.

11 Claims, 9 Drawing Sheets

(56) References Cited

U.S. PATENT DOCUMENTS

2013/0179142 A1* 7/2013 Kim .................. G06F 17/5036
703/14
2013/0185034 A1 7/2013 Murase et al.

FOREIGN PATENT DOCUMENTS

| JP | 2015106179 A | 6/2015 |
|----|--------------|--------|
| WO | 2012023397 A1 | 2/2012 |
| WO | 2013084654 A1 | 6/2013 |

OTHER PUBLICATIONS

Deelman et al. "Improving Lookahead in parallel Discrete Event Simulations of Large-Scale Applications using Compiler Analysis". 2001 IEEE. 9 pages.*

Kagami et al., "A Study of Parallel Discrete Event Simulator using Advance Processing", Information Processing Society of Japan96-DPS-77. Jul. 12, 1996, p. 67-72, vol. 96 No. 63.

Unknown, "Decision to Grant a Patent" for patent titled "A simulation device, a simulation method, and program," Patent Application No. 2013-246498, dated Mar. 9, 2016, translated May 27, 2016, 6 pages.

Ferscha et al., "Parallel and Distributed Simulation of Discrete Event Systems", University of Maryland Computer Science Department; CS-TR-3336, Oct. 15, 1998, pp. 1-51.

Jha et al., "Simultaneous Events and Lookahead in Simulation Protocols", ACM Transactions on Modeling and Computer Simulation, vol. 10, No. 3, Jul. 2000, pp. 241-267.

Munawar et al., "On-Time Data Exchange in Fully-Parallelized Co-Simulation With Conservative Synchronization", Proceedings of the 2013 Winter Simulation Conference, 978-1-4799-3950-3/13, ©2013 IEEE, pp. 2127-2138.

China Counterpart Patent Application No. 201410637489.3, entitled "Simulation Apparatus, Simulation Method, and Program", filed Nov. 6, 2014.

Japan Patent Application No. 2013-246498, entitled "Simulation Apparatus, Simulation Method, and Program", filed Nov. 28, 2013.

* cited by examiner

SIMULATION APPARATUS, SIMULATION METHOD, AND PROGRAM

BACKGROUND OF THE INVENTION

The present invention relates to a simulation apparatus, a simulation method, and a program.

Simulations of large-scale electronic control systems, such as automobiles, robots, and planes, have been executed by generating a simulation program using a conventionally known simulation modeling system, and without using expensive hardware for emulation. In this case, an electronic control system to be simulated is modeled as multiple functional blocks, which are executed in parallel to improve the speed of execution.

SUMMARY

According to an aspect of the present invention, there is a simulation method, computer program product and/or simulation apparatus for parallel execution of multiple logical processes obtained by modeling a plurality of components included in a system to be simulated that performs the following steps (not necessarily in the following order): (i) generating, on the basis of communication delays between the multiple logical processes: (a) constraint conditions to be satisfied by initial time shifts given to the multiple logical processes, and (b) look-ahead times, with each look-ahead time corresponding to a time interval to be permitted for look-ahead processing by a message sent from a logical process serving as a communication source to a logical process serving as a communication destination; (ii) solving an optimization problem satisfying the constraint conditions and minimizing overhead in communication of messages between the multiple logical processes; (iii) obtaining the initial time shifts of the multiple logical processes; and (iv) obtaining the look-ahead times between the multiple logical processes.

DETAILED DESCRIPTION

Some embodiments of the present invention recognize that in parallel execution of functional blocks simulated function blocks of an electronic control system, it can be difficult, except under limited conditions, to generate a simulation program for efficiently executing parallel processing while minimizing sending of messages between functional blocks. In particular, when there is communication in one direction and not in the opposite direction between some of multiple functional blocks, it has been difficult, or even impossible, to generate a simulation program for efficient execution of parallel processing.

Some embodiments of the present invention provide a simulation apparatus, a simulation method, and a program. The simulation apparatus performs parallel execution of multiple logical processes obtained by modeling multiple components included in a system to be simulated. The simulation apparatus includes: (i) a condition generating unit configured to generate, on the basis of communication delays between the multiple logical processes, constraint conditions to be satisfied by initial time shifts given to the multiple logical processes and "look-ahead times" each to be permitted by a message sent from a logical process serving as a communication source to a logical process serving as a communication destination to permit "look-ahead;" and (ii) a solver unit configured to: (a) solve an optimization problem satisfying the constraint conditions and minimizing overhead in communication of messages between the multiple logical processes, and (b) obtain the initial time shifts of the multiple logical processes and the look-ahead times between the multiple logical processes.

The present invention will now be described through the use of embodiments thereof. The following embodiments do not limit the invention according to claims. Not all combinations of features described in the embodiments are necessarily essential to the invention.

Figure 1:
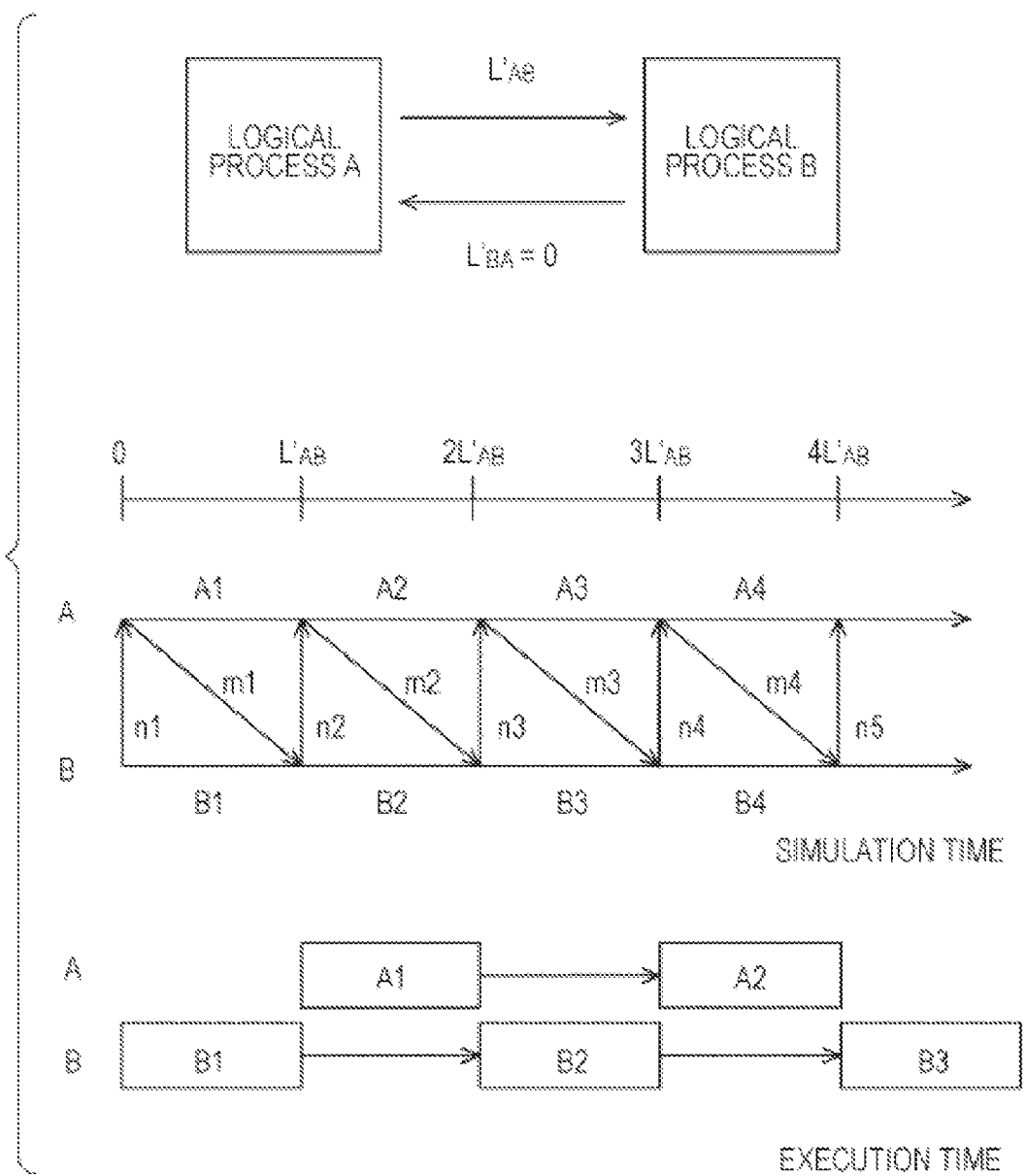
FIG. 1 illustrates logical processes and an exemplary operation of the logical processes according to an embodiment.

FIG. 1 illustrates logical processes and an operation of the logical processes according to an embodiment. FIG. 1 illustrates a configuration where a simulation is executed by two logical processes represented by A and B. Logical processes are functional blocks obtained by modeling a plurality of components included in a system to be simulated. A simulation modeling tool arranges such functional blocks and specifies a flow of processing.

Each logical process has the functions of elementary operations such as addition and multiplication, logical operations, formula manipulation such as integration, conditional branching, and calling of software code. For example, a logical process represents a unit of execution of a simulation. For example, logical processes A and B are each a logical process that simulates an operation of an engine, transmission, or electronic control unit of an automobile. Logical processes A and B operate in a coordinated manner while sending messages to each other.

Messages sent by logical processes include, for example, a message that permits look-ahead of a logical process on the receiving side. Time information may be added to the message. In this case, the time information may be information about a time at which look-ahead of the logical process on the receiving side is to end, or may be information about a period of time during which look-ahead of the logical process on the receiving side is permitted.

The time information added to the message is determined in advance, for example, in accordance with a transfer delay between logical processes on the sending and receiving sides. The transfer delay may be determined in accordance with the time required for propagation of a state, command/control, or the like between functions to be controlled by the logical processes.

When logical processes execute processing using a timer function, the period of time during which look-ahead of the logical process on the receiving side is permitted may be determined in advance in accordance with the time for which the timer is set by the logical process on the sending side and/or the time at which the logical process on the receiving side issues an alarm. The period described above may be determined in advance in accordance with the range of delay time permitted by the logical process on the receiving side.

Of the logical processes according to the present embodiment, a logical process that has pre-started processing at a simulation execution start time sends a message permitting look-ahead to the corresponding logical process after the elapse of a predetermined initial shift period. The other logical process which is not in look-ahead at the execution start time sends a message permitting look-ahead to the corresponding logical process at the execution start time.

In response to receipt of the message that permits look-ahead, each logical process pre-executes the corresponding operation. After the elapse of the period corresponding to time information added to the message, each logical process sends a message permitting look-ahead to the corresponding logical process.

If the next message that permits look-ahead is received, each logical process executes the corresponding next operation, whereas if the next message is not received, each logical process is placed in a standby state until the next message is received. The method that performs a simulation by maintaining synchronization while sending messages between multiple logical processes is known. A message sent is referred to as a null message.

FIG. 1 schematically illustrates a time difference in sending and receiving in communication between logical processes A and B as a time lag (time shift). In FIG. 1, $L'_{AB}$ denotes a time lag in sending a message from A to B (i.e., a look-ahead time which is an earliest time at which permission for execution is given to logical process B), and $L'_{BA}$ denotes a time lag in sending a message from B to A.

If both $L'_{AB}$ and $L'_{BA}$ are 0 ($L'_{AB}=L'_{BA}=0$), both the time lags are zero. This means that logical processes A and B are strongly coupled and cannot be executed in parallel. In this case, logical processes A and B cannot be separated into different logical processes and are calculated as a single simulator.

If neither of $L'_{AB}$ and $L'_{BA}$ is 0 ($L'_{AB}\neq L'_{BA}\neq 0$), synchronous processing is performed, for example, at a time step of the greatest common divisor between $L'_{AB}$ and $L'_{BA}$. Thus, execution of coupled simulation is achieved, where parallel operation takes place with no time error at the time of the greatest common divisor.

If one of $L'_{AB}$ and $L'_{BA}$, for example $L'_{BA}$, is 0 ($L'_{AB}\neq 0$, $L'_{BA}=0$), logical process A stays in a standby state until a message is received from logical process B. In this case, logical processes A and B alternately perform sequential execution.

The "simulation time" and "execution time" in FIG. 1 show an example of such a sequential operation, where the horizontal axis represents a time axis. In the simulation time in FIG. 1, exchanges of messages between logical processes A and B are indicated by arrows. For example, an arrow pointing upward from logical process B to logical process A in a direction perpendicular to the horizontal axis indicates that logical process B sends a message to logical process A with a time lag of 0.

An arrow pointing from logical process A to logical process B in a direction diagonal to the horizontal axis indicates that logical process A sends a message to logical process B with a time lag of 0 or more ($L'_{AB}$ in this example). Each message indicates that the logical process is permitted to execute processing until the tip position of the corresponding arrow.

In the execution time along the actual time axis in FIG. 1, a period during which each logical process executes a simulation is represented by a rectangle, whereas a period during which the logical process is in a standby state is represented by an arrow. That is, a period during which rectangles of logical processes overlap along the time axis corresponds to a period during which parallel operation takes place.

Logical processes A and B synchronize with each other, for example, by sending messages to each other at the start time. The sending from logical process A to logical process B (m1 in FIG. 1) notifies logical process B of a time lag of $L'_{AB}$. Therefore, logical process B can execute the simulation during period B1 in which the time of $L'_{AB}$ elapses. Because logical process A has received a message (n1) with $L'_{BA}=0$ from logical process B, logical process A cannot execute the simulation and enters a standby state to wait for a message from logical process B.

After the elapse of time corresponding to $L'_{AB}$, logical process B stops execution of the simulation and sends a message (n2) to logical process A. The message permits execution of logical process A until the end of the period corresponding to the elapsed $L'_{AB}$ with a time lag of 0 (i.e., until the end of the period of $L'_{AB}+0$ or the end of period A1). Then logical process B enters a standby state and waits for a message from logical process A.

In response to receipt of the message (n2) permitting execution, logical process A executes the simulation in period A1 during which the time of $L'_{AB}$ elapses. After the elapse of time corresponding to $L'_{AB}$ (i.e., after the elapse of time corresponding to $2L'_{AB}$ from the start of the simulation), logical process A stops execution of the simulation and sends a message (m2) to logical process B. The message permits execution of logical process B until the end of period B1 (=A1) with a time lag of $L'_{AB}$ (i.e., until the end of the period of $L'_{AB}+L'_{AB}$ or the end of period B2). Then logical process A enters a standby state and waits for a message from logical process B.

In response to the message (m2) from logical process A, logical process B exits the standby state and executes the simulation during period B2. After the elapse of period B2, logical process B stops execution of the simulation and sends a message (n3) to logical process A to permit logical process A to execute during a period of A2. Then logical process B enters a standby state and waits for a message from logical process A.

Logical processes A and B repeat this operation and execute the simulation while maintaining synchronization therebetween. However, since no parallel execution takes place, it is not possible to increase the speed of execution. Therefore, a predetermined period of time before start of the entire simulation is set as an initial time shift, and a predetermined logical process is pre-executed. Then, both the logical processes are executed in parallel.

Figure 2:
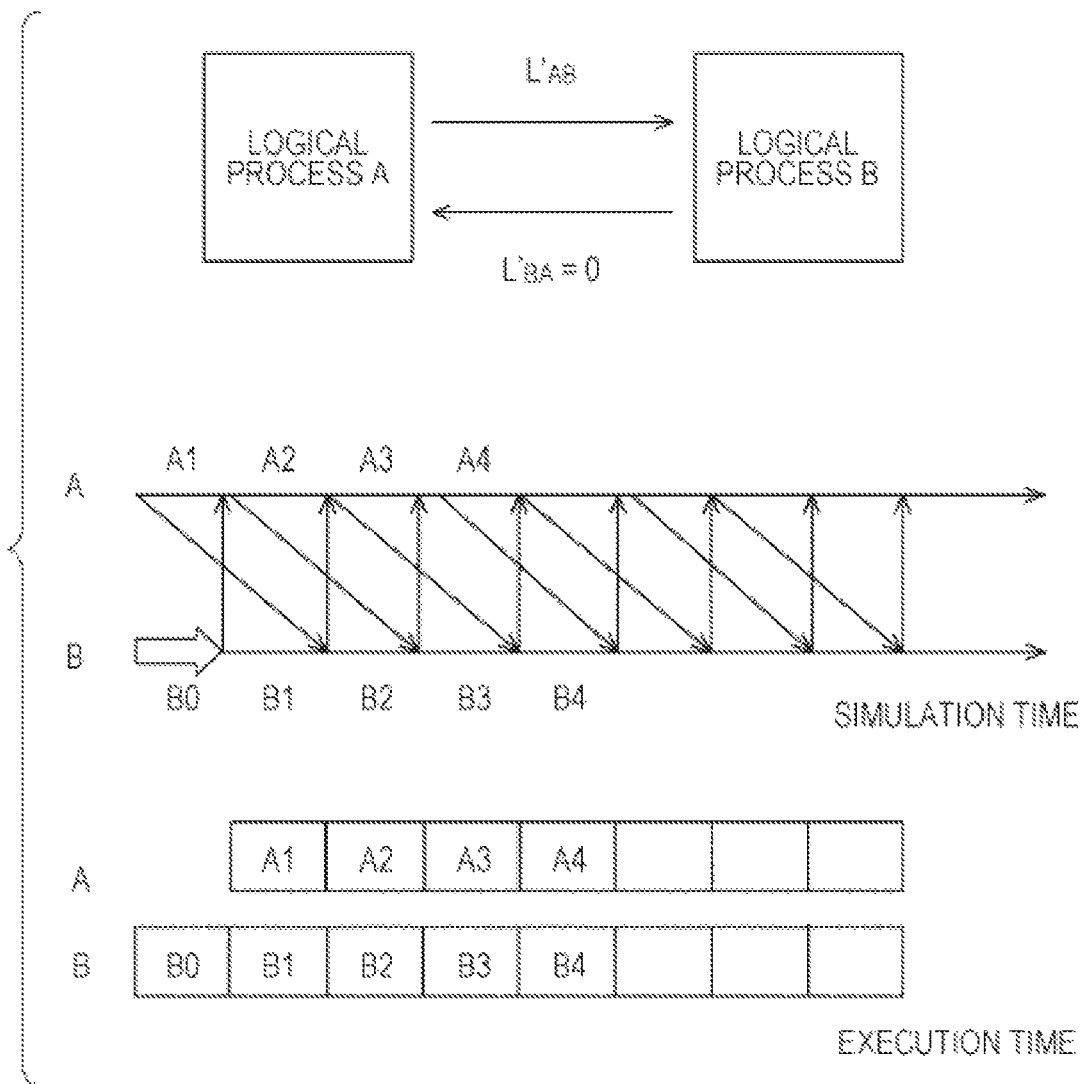
FIG. 2 illustrates logical processes and a first exemplary operation of the logical processes with an initial shift period according to the embodiment.

FIG. 2 illustrates logical processes and a first exemplary operation of the logical processes with an initial shift period according to the present embodiment. Like FIG. 1, FIG. 2 illustrates a configuration where a simulation is executed by logical processes A and B, and $L'_{BA}$ is 0 ($L'_{AB}\neq 0$, $L'_{BA}=0$).

In the present embodiment, an initial time shift of logical process A is denoted by SA, an initial time shift of logical process B is denoted by SB, and an initial shift period is expressed as SA−SB=($L'_{BA}$−$L'_{AB}$)/2. An initial time shift of a logical process is the amount of time that elapses from a predetermined reference time to a time when the logical process starts simulation processing.

Therefore, the initial shift period of logical processes A and B (SA−SB) is a difference between a processing start time of logical process A and a processing start time of logical process B. For example, the initial shift period of logical processes A and B (SA−SB) illustrated in FIG. 1 is 0, and the two logical processes start processing at substantially the same time.

In FIG. 2, where $L'_{BA}$=0, the initial shift period is expressed as SB−SA=$L'_{AB}$/2. This means that logical process B executes the simulation ahead of logical process A by the initial shift period ($L'_{AB}$/2). That is, logical process B pre-starts processing at the execution start time of logical process A (period B0). At the start time, logical process A sends a message to logical process B on the other side to permit logical process B to advance the processing until the end of period B1. At the same time, logical process A enters a standby state to wait for a message from logical process B.

In response to receipt of the message, logical process B starts the simulation. After the elapse of time corresponding to the initial shift period ($L'_{AB}$/2), logical process B sends a message that permits logical process A to execute until the end of period A1. Since the time corresponding to the permitted time lag $L'_{AB}$ has not elapsed at this point, logical process B continues execution of the simulation (proceeds to period B1).

In response to receipt of the execution permission message, logical process A executes the simulation in period A1 during which the time of $L'_{AB}$/2 elapses. After the elapse of time corresponding to $L'_{AB}$ from the start of the simulation, logical process A ends the simulation execution period A1 and sends a message to logical process B to permit execution until the end of period B2. Logical process B ends the simulation execution period B1 and sends a message to logical process A to permit execution until the end of period A2. At the same time, logical process B starts execution of the simulation in period B2 in response to the message.

In response to receipt of the execution permission message, logical process A executes the simulation in period A2. After the elapse of time corresponding to 1.5 $L'_{AB}$ from the start of the simulation, logical process A ends the simulation execution period A2 and sends a message to logical process B to permit execution until the end of period B3. Logical process B ends the simulation execution period B2 and sends a message to logical process A to permit execution until the end of period A3. At the same time, logical process B starts execution of the simulation in period B3 in response to the message.

Logical processes A and B repeat this operation and execute the simulation in parallel while maintaining synchronization therebetween. This makes it possible to reduce the overall time of simulation execution.

Figure 3:
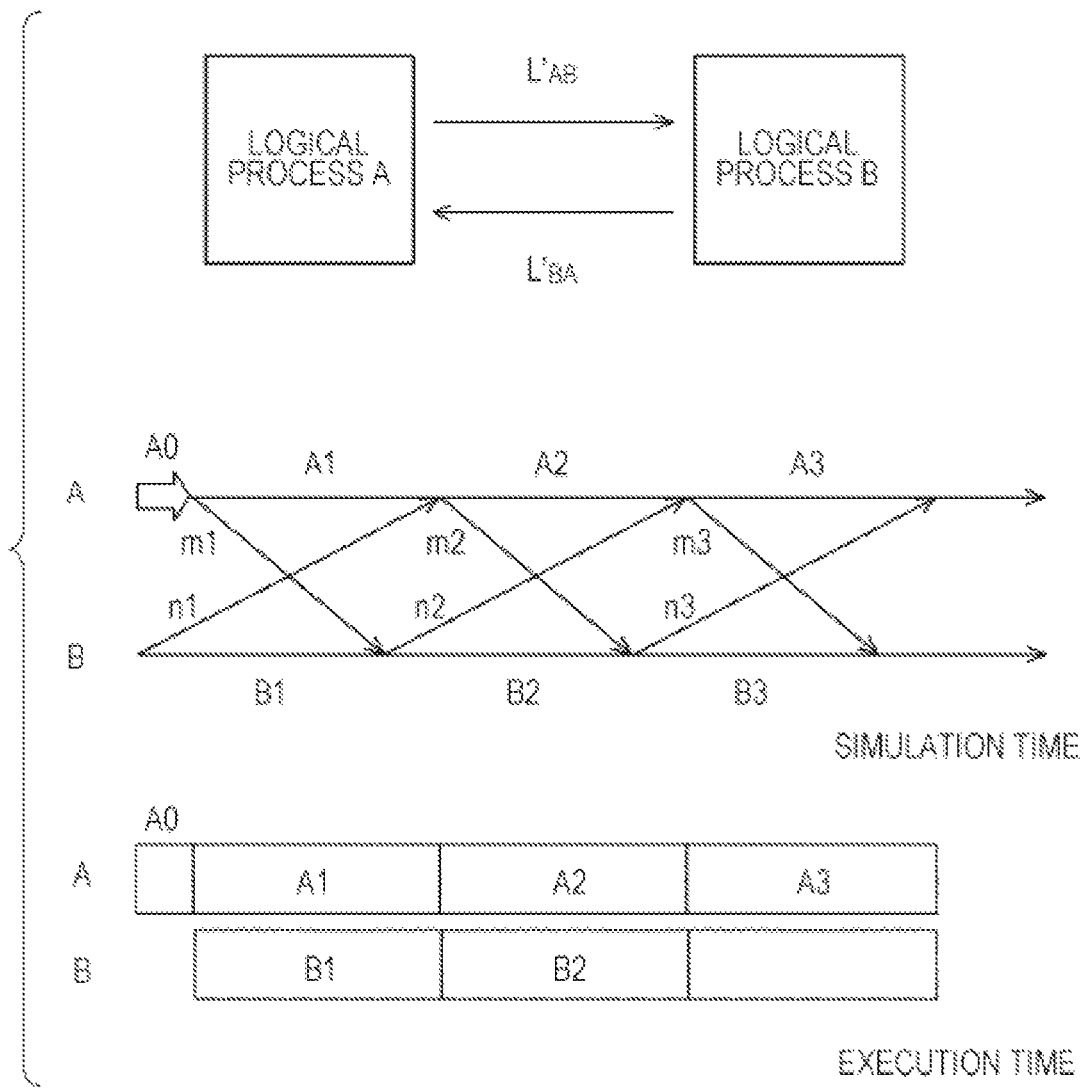
FIG. 3 illustrates logical processes and a second exemplary operation of the logical processes with an initial shift period according to the embodiment.

Even when neither of $L'_{AB}$ and $L'_{BA}$ is 0 ($L'_{AB} \neq 0$, $L'_{BA} \neq 0$), the period of parallel execution of logical processes can be increased by permitting look-ahead of a predetermined logical process, with a predetermined period of time set as an initial shift period. FIG. 3 illustrates logical processes and a second exemplary operation of the logical processes with an initial shift period according to the embodiment. Like FIGS. 1 and 2, FIG. 3 illustrates a configuration where a simulation is executed by logical processes A and B. Here, neither of $L'_{AB}$ and $L'_{BA}$ is 0 ($L'_{AB} \neq 0$, $L'_{BA} \neq 0$).

Again, an initial time shift of logical process A is denoted by SA, an initial time shift of logical process B is denoted by SB, and an initial shift period is expressed as SA−SB= ($L'_{BA}$−$L'_{AB}$)/2. Here, the initial shift period is set to satisfy SA−SB=($L'_{BA}$−$L'_{AB}$)/2>0 (i.e., $L'_{BA}$>$L'_{AB}$) and logical process A executes the simulation in the predetermined initial shift period (($L'_{BA}$−$L'_{AB}$)/2) ahead of logical process B.

Specifically, at the start time, logical process B sends a message (n1) to logical process A to permit execution until the end of period (A1) corresponding to a time lag $L'_{BA}$. At the same time, logical process A starts the simulation in period A0 during which the time of ($L'_{BA}$−$L'_{AB}$)/2 elapses. Here, logical process B enters a standby state and waits for a message from logical process A.

After the elapse of time corresponding to ($L'_{BA}$−$L'_{AB}$)/2, logical process A sends a message (m1) to logical process B to permit execution until the end of period (B1) corresponding to a time lag $L'_{AB}$. Since the time corresponding to the permitted period A1 has not elapsed at this point, logical process A continues execution of the simulation (proceeds to period A1).

In response to receipt of the execution permission message (m1), logical process B executes the simulation until the end of period B1 during which the time of $L'_{AB}$+($L'_{BA}$−$L'_{AB}$)/2(=($L'_{AB}$+$L'_{BA}$)/2) elapses. After execution of the simulation in period B1, logical process B sends a message (n2) to logical process A to permit execution until the end of period A2.

After the elapse of time corresponding to $L'_{BA}$ from the start point (i.e., after the elapse of time corresponding to the time of $L'_{BA}$−($L'_{BA}$−$L'_{AB}$)/2=($L'_{AB}$+$L'_{BA}$)/2 from the start of period A1), logical process A ends the simulation execution period A1. Then logical process A sends a message (m2) to logical process B to permit execution until the end of period B2. The start time of period A1 and the start time of period B1 are substantially the same as a time point after the elapse of period A0 from the start of the simulation. The time corresponding to each of periods A1 and B1 is substantially equal to ($L'_{AB}$+$L'_{BA}$)/2.

Therefore, logical processes A and B receive messages that permit execution until the respective ends of the next periods (A2 and B2) at substantially the same time and execute processing in the next periods at substantially the same time. Logical processes A and B repeat this operation and execute the simulation in parallel while maintaining synchronization therebetween. By permitting look-ahead of a predetermined logical process, it is possible to increase the period of parallel execution of logical processes and reduce the overall time of simulation execution.

Although a simulation is executed by two logical processes in the description above, it may be executed similarly by three or more logical processes. Here, one logical process receives execution permission messages from a plurality of other logical processes. In this case, the one logical process executes processing during a period which is the shortest of all periods permitted by the plurality of messages, on the assumption that processing until the end of the shortest period is permitted.

In setting an initial time shift of each logical process as described above, the initial time shift can be analytically calculated in the case of a simple communication link configuration, such as a tree configuration or a configuration where each process sends messages on a one-to-one basis. That is, each initial time shift can be calculated by solving the simultaneous equations, $S_A$−$S_B$=($L'_{BA}$−$L'_{AB}$)/2, $S_B$−$S_C$= ($L'_{CB}$−$L'_{BC}$)/2, . . . , $S_R$−$S_Z$=($L'_{ZR}$−$L'_{RZ}$)/2, and $S_A$=C. Here, the equation $S_A$=C indicates that $S_A$ is used as a temporary reference for the calculation of the initial time shift. The reference can be corrected to a proper reference by subsequent processing.

However, if a connection between logical processes is complicated, the number of simultaneous equations may not match the number of initial time shifts to be calculated. For example, if the number of simultaneous equations is greater than the number of initial time shifts, an equation corresponding to a connection between logical processes with lower priority may be removed. With this processing, it is possible to make the number of simultaneous equations the same as the number of initial time shifts and thus to analytically calculate the simultaneous equations. However, because this requires a judgment based on user's experience or the like, initial time shifts cannot be determined by a consistent algorithm.

Also, for example, if the number of simultaneous equations is smaller than the number of initial time shifts (e.g., if some of multiple logical processes have a connection in one direction but not in the other direction therebetween), the simultaneous equations cannot be solved and hence the initial time shifts cannot be determined. That is, unless the number of initial time shifts matches the number of simultaneous equations, it is difficult to determine the initial time shifts without a judgment and processing based on user's experience, additional information, etc.

Figure 4:
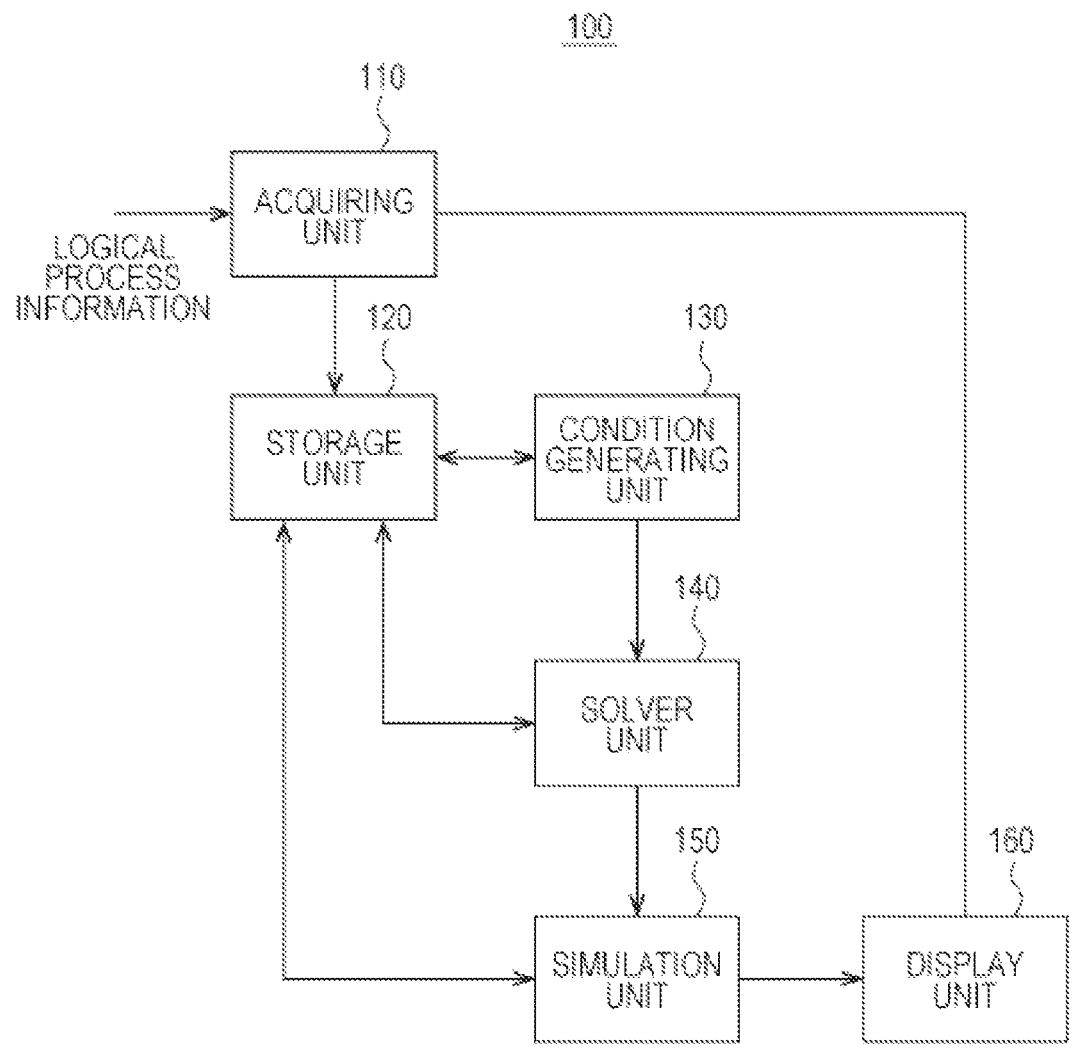
FIG. 4 illustrates an exemplary configuration of a simulation apparatus 100 according to the embodiment.

A simulation apparatus 100 according to the present embodiment formulates an initial time shift of each logical process as a constrained optimization problem, and thereby automatically determines the initial time shift without a judgment and processing based on user's experience, additional information, etc. FIG. 4 illustrates an exemplary configuration of the simulation apparatus 100 according to the present embodiment.

The simulation apparatus 100 determines parameters of multiple logical processes obtained by modeling a plurality of components included in a system to be simulated, and executes the multiple logical processes in parallel. The simulation apparatus 100 includes an acquiring unit 110, a storage unit 120, a condition generating unit 130, a solver unit 140, a simulation unit 150, and a display unit 160.

The acquiring unit 110 acquires information about logical processes (hereinafter may be referred to as logical process information). For each logical process, the acquiring unit 110 acquires information, such as what is to be simulated (or processed), a counterpart with which to exchange messages, contents of messages, and communication delays (time lags) that occur between logical processes in the communication of messages. The acquiring unit 110 may acquire logical process information from user input, or may acquire it by reading data stored in advance in a predetermined format.

The acquiring unit 110 may be connected to a network, acquire logical process information at a location different from a main unit of the simulation apparatus 100, and supply the acquired information to the main unit via the network. In this case, the acquiring unit 110 may be implemented by another apparatus, and may perform acquisition of logical process information as pre-processing of the main unit of the simulation apparatus 100. For example, the acquiring unit 110 supplies the acquired logical process information to the storage unit 120.

The storage unit 120 is connected to the acquiring unit 110 and stores logical process information received from the acquiring unit 110. For example, the storage unit 120 supplies the stored logical process information to the condition generating unit 130 in response to a request from the condition generating unit 130. The storage unit 120 may store library data and a program for executing a simulation. The storage unit 120 may store data and programs generated by the simulation apparatus 100 in the process of executing the simulation.

On the basis of communication delays between multiple logical processes, the condition generating unit 130 generates constraint conditions to be satisfied by initial time shifts given to the multiple logical processes and look-ahead times each to be permitted by a message sent from a logical process serving as a communication source to a logical process serving as a communication destination to permit look-ahead. The condition generating unit 130 is connected to the storage unit 120, receives information of communication delays ($L'_{XY}$ etc.) that occur between logical processes, and generate constraint conditions based on the information.

The constraint conditions of the present embodiment refer to conditions to be satisfied by parameters which are a look-ahead time to be permitted by a null message sent by each logical process and an initial time shift (e.g., Sn) of each logical process. For example, the look-ahead time is a parameter denoted by $L_{XY}$, and the minimum value of the look-ahead time is 0 and the maximum value of the look-ahead time is equal to a communication delay $L'_{XY}$. The look-ahead time $L_{XY}$ represents a time for pre-executing part of an unprocessed simulation between corresponding logical processes (e.g., the look-ahead time $L_{XY}$ is permitted by a message from logical process X to logical process Y). The look-ahead time $L_{XY}$ may be a time lag and/or a time for look-ahead processing.

The solver unit 140 solves an optimization problem that satisfies constraint conditions and minimizes overhead in communication of messages between multiple logical processes, and obtains initial time shifts of the multiple logical processes and look-ahead times between the multiple logical processes. The solver unit 140 is connected to the condition generating unit 130 and receives constraint conditions generated by the condition generating unit 130. Alternatively, the condition generating unit 130 may store the generated constraint conditions in the storage unit 120, and the solver unit 140 may be connected to the storage unit 120 and read the constraint conditions from the storage unit 120.

The solver unit 140 allows parallel execution of more logical processes and increases processing time for the parallel execution, so as to minimize overhead in communication of messages. Thus, the solver unit 140 obtains initial time shifts and look-ahead times that allow multiple logical processes to perform concurrent execution (i.e., parallel execution) of the simulation. The solver unit 140 may store the initial time shifts and the look-ahead times in the storage unit 120, or may directly supply them to the simulation unit 150.

The simulation unit 150 starts each of multiple logical processes after the initial time shift, and executes the multiple logical processes in parallel while causing each logical process to send a message that permits look-ahead during the look-ahead time. The simulation unit 150 is connected to the storage unit 120, reads information about each logical process, an initial time shift, a look-ahead time, a program used for executing the simulation, a library, and the like, and executes the simulation by executing the multiple logical processes in parallel.

The display unit 160 displays a simulation result. The display unit 160 is connected to the simulation unit 150 and displays, for example, simulation execution time, parallel execution time, time shortened by parallel execution, efficiency achieved by parallel execution, and/or information about each logical process. The display unit 160 may be connected to the acquiring unit 110, and may display a state of acquisition of information about each logical process acquired by the acquiring unit 110. The display unit 160 may display a state and confirmation of progress in the process of simulation executed by the simulation apparatus 100.

The display unit 160 may be connected to the storage unit 120 and display, in response to a user request, information about each logical process, an initial time shift, a look-ahead time, a program used for executing the simulation, a library, etc. The simulation apparatus 100 of the present embodiment enhances parallelism of multiple logical processes, minimizes overhead involved in concurrent processing, automatically calculates an initial time shift and a look-ahead time of each logical process executed without turning back, and executes a simulation by executing the multiple logical processes. Concrete operations of the simulation apparatus 100 will now be described.

Figure 5:
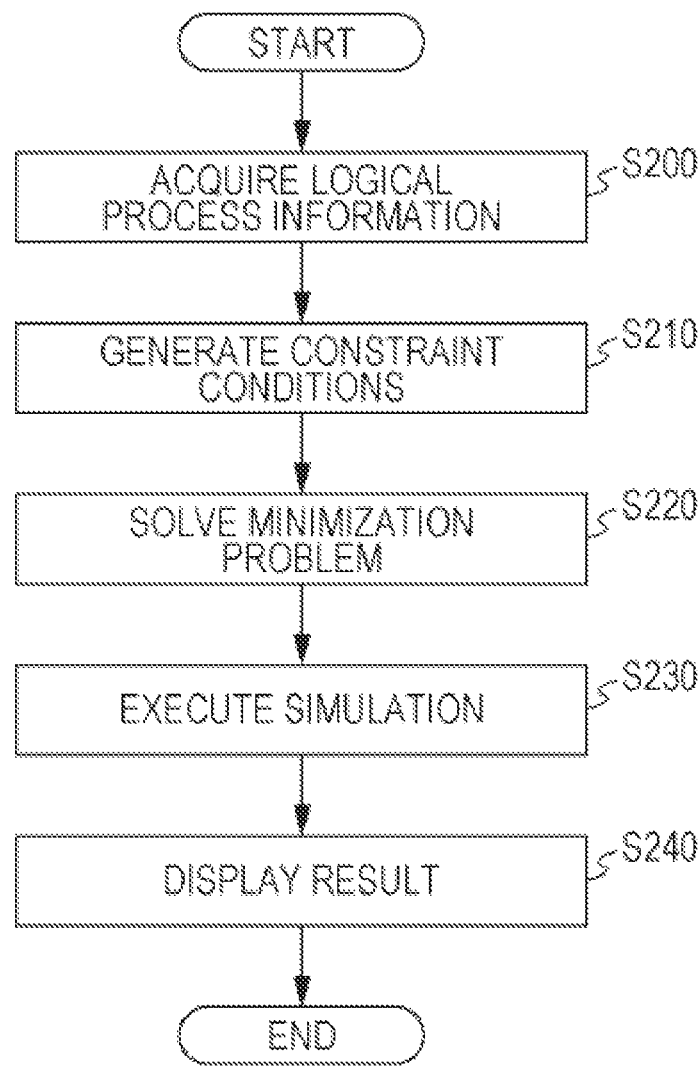
FIG. 5 illustrates an operation flow of the simulation apparatus 100 according to the embodiment.

FIG. 5 illustrates an operation flow of the simulation apparatus 100 according to the present embodiment. First, the acquiring unit 110 acquires information about multiple logical processes (step S200). The acquiring unit 110 acquires information including the source and destination of messages sent and received between the logical processes and communication delays ($L'_{AB}$, $L'_{BA}$, etc.) corresponding to the sending and receiving, and stores the acquired information in the storage unit 120.

For example, the acquiring unit 110 is connected to input devices, such as a keyboard, a mouse, a pen tablet, and a touchpad, and acquires information about logical processes through a graphical user interface (GUI) operating in conjunction with the display unit 160. In this case, the user arranges multiple functional blocks on a screen of the display unit 160 by using the GUI, and inputs information about the functional blocks and a flow of processing.

Next, the condition generating unit 130 generates constraint conditions based on the information about the multiple logical processes (step S210). The condition generating unit 130 generates a constraint condition where a look-ahead time (e.g., $L_{AB}$, $L_{BA}$) to be permitted by a message from each logical process serving as a communication source to each logical process serving as a communication destination is shorter than or equal to a communication delay (e.g., $L'_{AB}$, $L'_{BA}$) in communication from the logical process serving as a communication source to the logical process serving as a communication destination. Specifically, the condition generating unit 130 generates constraint conditions represented by the following expressions.

$$0 \leq L_{AB} \leq L'_{AB}$$

$$0 \leq L_{BA} \leq L'_{BA} \qquad \text{(Expression 1)}$$

The expressions in Expression 1 show exemplary constraint conditions generated for two logical processes A and B by the condition generating unit 130. As described above, the condition generating unit 130 generates a constraint condition where a look-ahead time permitted for each logical process (e.g., $L_{AB}$, $L_{BA}$) is shorter than or equal to a communication delay of each logical process (e.g., $L'_{AB}$, $L'_{BA}$). Therefore, a solution (i.e., $L_{AB}$, $L_{BA}$, etc.) that satisfies the constraint condition does not exceed the communication delay of each logical process, and messages can be stably sent and received between processes.

Also, the condition generating unit 130 generates constraint conditions for a look-ahead time (e.g., $L_{AB}$, $L_{BA}$) and an initial time shift (e.g., $S_A$, $S_B$) of each logical process. For example, the condition generating unit 130 generates constraint conditions represented by the following expressions.

$$S_A - S_B = (L_{BA} - L_{AB})/2$$

$$S_A \geq 0, S_B \geq 0 \qquad \text{(Expression 2)}$$

Like the expressions in Expression 1, the expressions in Expression 2 show exemplary constraint conditions generated for two logical processes A and B by the condition generating unit 130. The condition generating unit 130 may generate a constraint condition where, between logical processes communicating with each other among the multiple logical processes, a difference between initial time shifts of a first logical process and a second logical process ($S_A - S_B$ in Expression 2) is proportional to at least one of the look-ahead time $L_{BA}$ permitted by a message from the second logical process to the first logical process and the look-ahead time $L_{AB}$ permitted by a message from the first logical process to the second logical process (e.g., $S_A - S_B = \alpha L_{BA}$, $S_A - S_B = \alpha L_{AB}$, etc.). In this case, for example, the condition generating unit 130 sets a proportionality factor $\alpha$ to be greater than 0 and smaller than 1.

Alternatively, the condition generating unit 130 may generate a constraint condition where a difference between initial time shifts of the first logical process and the second logical process ($S_A - S_B$ in Expression 2) is set to a value obtained by bringing a difference between a look-ahead time permitted by a message from the second logical process to the first logical process and a look-ahead time permitted by a message from the first logical process to the second logical process ($L_{BA} - L_{AB}$ in Expression 2) close to 0. That is, the condition generating unit 130 generates a constraint condition as an equation ($S_A - S_B = \alpha(L_{BA} - L_{AB})$) in which a difference between the initial time shifts ($S_A - S_B$) is equal to a value obtained by multiplying a factor $\alpha$ by a difference between the look-ahead times ($L_{BA} - L_{AB}$), where cc is a factor greater than 0 and smaller than 1 ($0 < \alpha < 1$).

In this case, for example, the condition generating unit 130 sets a difference between the initial time shifts of the first logical process and the second logical process to be in the range from one-fourth to three-fourths of a difference between the look-ahead time permitted by a message from the second logical process to the first logical process and the look-ahead time permitted by a message from the first logical process to the second logical process. In the case of deadlock where logical processes have to wait for sending from each other, the condition generating unit 130 may solve the deadlock, for example, by bringing the difference between the initial time shifts close to half the difference between the look-ahead times. For example, the condition generating unit 130 generates a constraint condition where the difference between the initial time shifts of the first logical process and the second logical process is half the difference between the look-ahead time permitted by a message from the second logical process to the first logical process and the look-ahead time permitted by a message from the first logical process to the second logical process. The expressions in Expression 2 show exemplary constraint conditions generated by the condition generating unit 130, in which a difference between initial time shifts ($S_A - S_B$) is proportional to half a difference between look-ahead times ($L_{BA} - L_{AB}$).

Next, the solver unit 140 solves an optimization problem that satisfies constraint conditions generated by the condition generating unit 130, enhances parallelism of multiple logical processes, and minimizes overhead involved in concurrent processing (step S220). For example, the solver unit 140 solves a maximization problem that satisfies constraint conditions and maximizes the sum of look-ahead times in multiple logical processes. The solver unit 140 solves, for example, a minimization problem that minimizes the following expression while satisfying the constraint conditions represented by Expressions 1 and 2.

$$1/(L_{BA}+L_{AB}) \quad \text{(Expression 3)}$$

Although Expression 3 shows an exemplary expression for two logical processes A and B, the minimization problem may be expressed by the following expression for two or more logical processes.

$$\text{Minimization} \sum_{X \neq Y} \frac{1}{L_{XY} + L_{YX}} \quad \text{(Expression 4)}$$

Since the constraint conditions represented by Expressions 1 and 2 and the expression in Expression 3 to be minimized are determined as above, the solver unit 140 can solve the minimization problem using a known calculation method. For example, the solver unit 140 can minimize the expression in Expression 3 using a gradient method, such as a steepest descent method which is known as a solution to a continuous non-linear optimization problem. That is, as a solution that minimizes the expression in Expression 3, the solver unit 140 obtains initial time shifts of multiple logical processes and look-ahead times between the multiple logical processes.

There are cases where the number of simultaneous equations generated in accordance with sending and receiving of messages between logical processes matches the number of initial time shifts to be calculated. In other words, there are cases where the look-ahead times and the initial time shifts ($S_A$, $S_B$, ...) can be analytically calculated, as described with reference to FIGS. 2 and 3. In such cases, the solver unit 140 obtains, as solutions, look-ahead times and initial time shifts substantially equal to the look-ahead times which are analytical solutions and the initial time shifts ($S_A$, $S_B$, ...) equal to the acquired communication delays. That is, the solver unit 140 can obtain look-ahead times and initial time shifts that can reduce the overall simulation execution time by allowing parallel execution of logical processes, as described with reference to FIGS. 2 and 3.

There are cases where the number of simultaneous equations generated in accordance with sending and receiving of messages between logical processes does not match the number of initial time shifts to be calculated. In other words, there are cases where the initial time shifts cannot be calculated without any additional information, processing, etc. Even in such cases, when the condition generating unit 130 generates constraint conditions corresponding to simultaneous equations and the solver unit 140 solves a minimization problem, it is possible to obtain appropriate look-ahead times and initial time shifts that satisfy the constraint conditions without increasing or decreasing the number of simultaneous equations.

Figure 6:
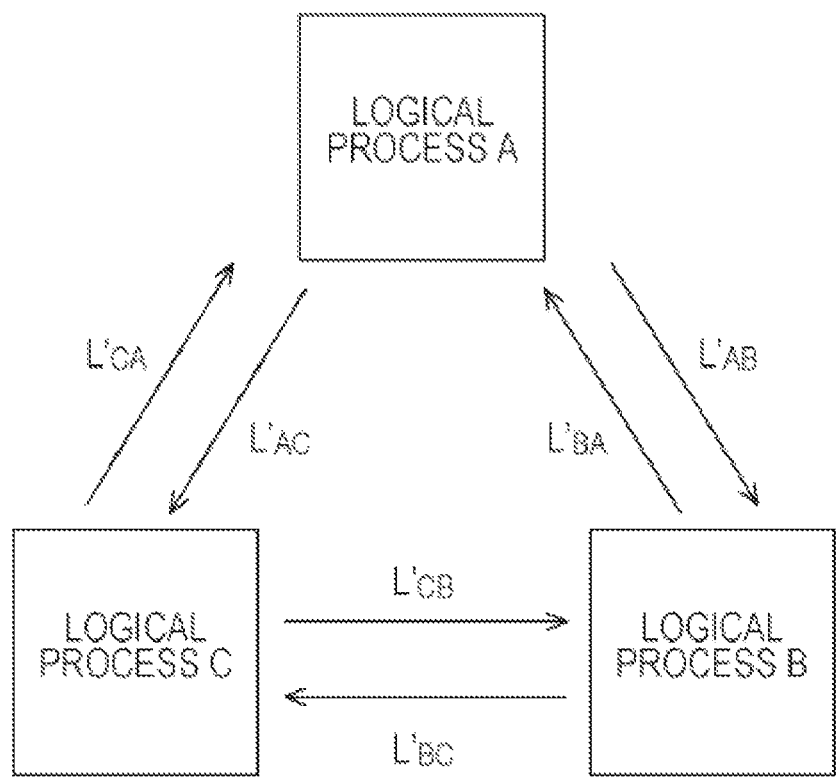
FIG. 6 illustrates a first exemplary configuration with three logical processes according to the embodiment.

FIG. 6 illustrates a first exemplary configuration with three logical processes according to the present embodiment. As described with reference to FIGS. 1 to 3, $L'_{XY}$ in FIG. 6 denotes a time lag in sending a message from logical process X to logical process Y. For the configuration of FIG. 6, the condition generating unit 130 generates constraint conditions represented by the following expressions.

$$S_A - S_B = (L_{BA} - L_{AB})/2$$

$$S_B - S_C = (L_{CB} - L_{BC})/2$$

$$S_C - S_A = (L_{AC} - L_{CA})/2$$

$$S_A \geq 0, S_B \geq 0, S_C \geq 0$$

$$0 \leq L_{XY} \leq L'_{XY} \quad \text{(Expression 5)}$$

The solver unit 140 solves the minimization problem represented by the expression in Expression 4 while satisfying the constraint conditions represented by the expressions in Expression 5, and obtains look-ahead times $L_{XY}$ and initial time shifts ($S_A$, $S_B$, $S_C$). As in Expression 6 below, the solver unit 140 may degenerate the constraint conditions by adding up the first to third equations in Expression 5.

$$L_{AB} + L_{BC} + L_{CA} = L_{BA} + L_{AC} + L_{CB}$$

$$0 \leq L_{XY} \leq L'_{XY} \quad \text{(Expression 6)}$$

The left side of the equation in Expression 6 represents a look-ahead time in a communication link (connection) where messages are sent clockwise, and the right side of the equation represents a look-ahead time in a communication link where messages are sent counterclockwise. In such a case, since the solver unit 140 performs optimization to maximize the total sum of $L_{XY}$, one of the left and right sides of the equation typically becomes an upper limit ($L'_{AB} + L'_{BC} + L'_{CA}$ or $L'_{BA} + L'_{AC} + L'_{CB}$).

For example, the total sum of time lags in at least one of the clockwise and counterclockwise communication links may be zero. In this case, at least one of loops of the three logical processes has no time lag (i.e., $L'_{AB} = L'_{BC} = L'_{CA} = 0$ and/or $L'_{BA} + L'_{AC} + L'_{CB} = 0$), and the solver unit 140 cannot obtain a solution, because logical processes A, B, and C are strongly coupled and cannot be executed in parallel.

Figure 7:
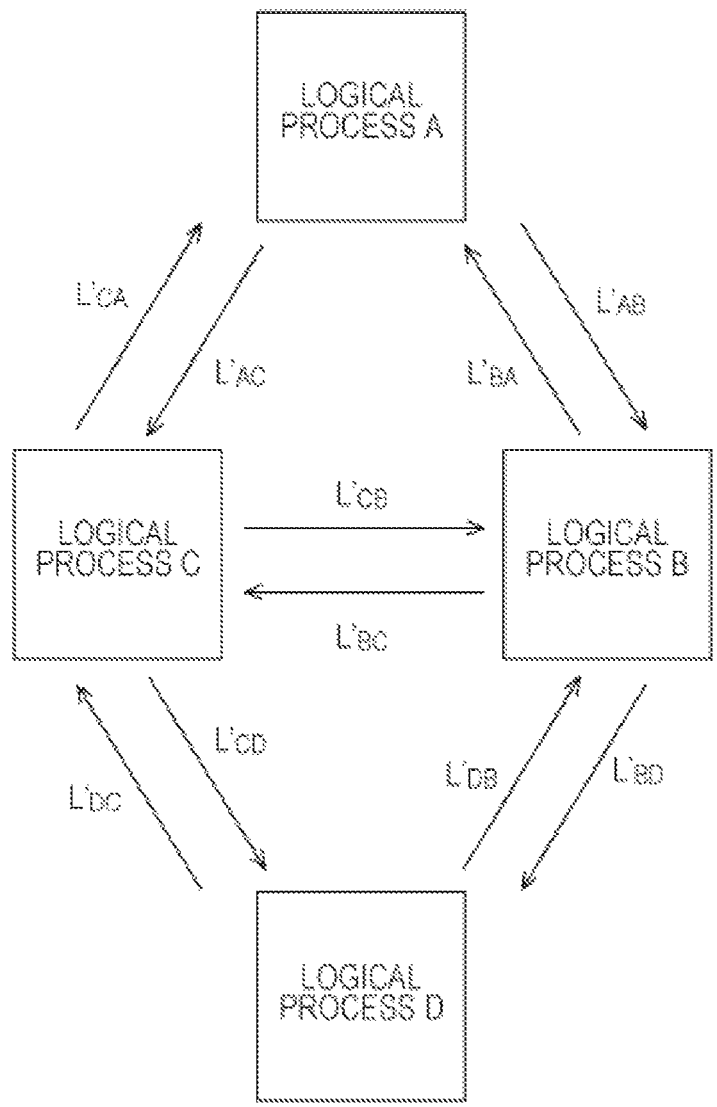
FIG. 7 illustrates an exemplary configuration with four logical processes according to the embodiment.

FIG. 7 illustrates an exemplary configuration with four logical processes according to the present embodiment. As in FIG. 6, $L'_{XY}$ in FIG. 7 denotes a time lag in sending a message from logical process X to logical process Y. For the configuration of FIG. 7, the condition generating unit 130 generates constraint conditions represented by the following expressions.

$$S_A - S_B = (L_{BA} - L_{AB})/2$$

$$S_B - S_C = (L_{CB} - L_{BC})/2$$

$$S_C - S_A = (L_{AC} - L_{CA})/2$$

$$S_B - S_D = (L_{DB} - L_{BD})/2$$

$$S_D - S_C = (L_{CD} - L_{DC})/2$$

$$S_A \geq 0, S_B \geq 0, S_C \geq 0, S_D \geq 0$$

$$0 \leq L_{XY} \leq L'_{XY} \quad \text{(Expression 7)}$$

The solver unit 140 solves the minimization problem represented by the expression in Expression 4 while satisfying the constraint conditions represented by the expressions in Expression 7, and obtains look-ahead times $L_{XY}$ and initial time shifts (SA, SB, Sc, SD). As in Expression 8 below, the solver unit 140 may degenerate the constraint conditions by using the first to third equations and the second, fourth, and fifth equations in Expression 7.

$$L_{AB} + L_{BC} + L_{CA} = L_{BA} + L_{AC} + L_{CB}$$

$$L_{CB} + L_{BD} + L_{DC} = L_{BC} + L_{CD} + L_{DB}$$

$$0 \leq L_{XY} \leq L'_{XY} \quad \text{(Expression 8)}$$

As described above, the condition generating unit 130 of the present embodiment generates constraint conditions and the solver unit 140 of the present embodiment solves the minimization problem on the basis of information about multiple logical processes acquired by the acquiring unit 110. Thus, it is possible to obtain appropriate look-ahead times and initial time shifts that satisfy the constraint conditions. Even in the configuration where part of communication links between logical processes is absent, the condition generating unit 130 can generate constraint conditions and the solver unit 140 can solve the minimization problem.

Figure 8:
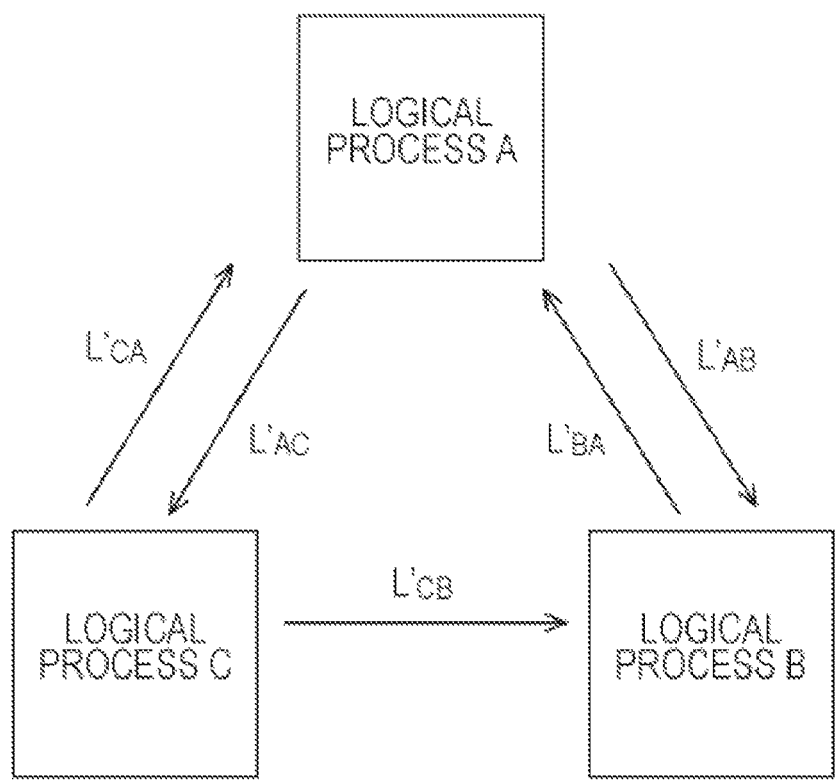
FIG. 8 illustrates a second exemplary configuration with three logical processes according to the embodiment.

FIG. 8 illustrates a second exemplary configuration with three logical processes according to the present embodiment. In the second exemplary configuration, operations substantially the same as those in the first exemplary configuration with three logical processes according to the embodiment illustrated in FIG. 6 are denoted by the same reference numerals and the description thereof is omitted. In the second exemplary configuration, when one logical process does not directly communicate with another logical process, the condition generating unit 130 does not set an upper limit on the look-ahead time permitted by a message from the one logical process to the other logical process. That is, a communication delay in a communication link where no direct communication takes place is set to infinity by the condition generating unit 130.

For the configuration of FIG. 8, the condition generating unit 130 generates constraint conditions represented by the following expressions.

$$S_A - S_B = (L_{BA} - L_{AB})/2$$

$$S_B - S_C = (L_{CB} - L_{BC})/2$$

$$S_C - S_A = (L_{AC} - L_{CA})/2$$

$$S_A \geq 0, \ S_B \geq 0, \ S_C \geq 0$$

$$0 \leq L_{XY} \leq L'_{XY}, \text{ where } L'_{BC} = \infty \quad \text{(Expression 9)}$$

The solver unit 140 solves the minimization problem represented by the expression in Expression 4 while satisfying the constraint conditions represented by the expressions in Expression 9, and obtains look-ahead times $L_{XY}$ and initial time shifts ($S_A$, $S_B$, $S_C$). For example, the solver unit 140 can obtain a solution $L_{BC} = 30$ for communication delays $L'_{AB} = 100$, $L'_{BA} = 80$, $L'_{CB} = 90$, $L'_{CA} = 40$, and $L'_{AC} = 0$.

Next, on the basis of the obtained look-ahead times and initial time shifts, the simulation unit 150 executes a simulation (step S230). The simulation unit 150 pre-executes a logical process from a simulation execution start time, the logical process having an initial time shift whose difference from a smallest initial time shift is not 0, with the difference set as an initial shift period.

For example, if the initial time shifts of logical processes A, B, and C are $S_A = 0$, $S_B = 50$, and $S_C = 75$, respectively, the simulation unit 150 pre-executes logical processes B and C, because logical processes B and C have initial time shifts whose differences from a smallest initial time shift ($S_A = 0$) are not 0 ($S_B - S_A = 50$, $S_C - S_A = 75$). Here, an initial shift period is a difference from the initial time shift SA of logical process A. That is, the initial shift period of logical process B is 50 and the initial shift period of logical process C is 70. Numerical values described here are merely examples, and any standardized values may be used.

The simulation unit 150 causes a logical process which is not pre-executed from the execution start time to send messages permitting look-ahead to the corresponding logical processes at the simulation execution start time. For example, at the simulation execution start time, the simulation unit 150 causes logical process A to send messages to logical processes B and C.

Then, the simulation unit 150 causes a logical process whose initial shift period has elapsed to send messages permitting look-ahead to the corresponding logical processes. For example, after the elapse of time of 50, the simulation unit 150 causes logical process B to send messages to logical processes A and C. Similarly, after the elapse of time of 75, the simulation unit 150 causes logical process C to send messages to logical processes A and B.

The simulation unit 150 advances execution of each logical process until the end of the shortest of the look-ahead times permitted by messages sent to the logical process, and causes the logical process to send messages to other logical processes. That is, for example, the simulation unit 150 causes logical process A to execute processing until the end of the shorter of look-ahead times received from logical processes B and C. Then, the simulation unit 150 causes logical process A to stop processing, send the next messages to logical processes B and C, and enter a standby state to wait until messages are received from logical processes B and C.

Similarly, the simulation unit 150 causes logical process B to execute processing until the end of the shorter of look-ahead times received from logical processes C and A. Then, the simulation unit 150 causes logical process B to stop processing, send the next messages to logical processes C and A, and enter a standby state to wait until messages are received from logical processes C and A.

As in the cases of logical processes A and B, the simulation unit 150 causes logical process C to execute processing and send messages. The simulation unit 150 can execute multiple logical processes in parallel by repeating the operation described above until the end of the simulation.

The display unit 160 displays a result of the simulation executed by the simulation unit 150 (step S240). The simulation unit 150 may store the simulation result and/or a simulation program in the storage unit 120.

As described above, the simulation apparatus 100 of the present embodiment is capable of executing a simulation on the basis of the communication delays between logical processes. The simulation apparatus 100 generates a constraint condition which does not exceed a communication delay, and formulates a time lag of each logical process to be adjusted as an optimization problem for optimization that maximizes a look-ahead time, so that the look-ahead time and an initial time shift can be automatically obtained. Even when there is a connection in one direction but not in the opposite direction between some of multiple logical processes, the optimization problem can be solved and the simulation can be executed by generating a simulation program.

The simulation apparatus 100 can pre-execute part of multiple logical processes from a simulation execution start time until an initial shift period has elapsed, and thus can efficiently execute the logical processes in parallel. In this case, again, the simulation apparatus 100 can automatically determine a logical process to be pre-executed and the initial shift period of the logical process.

Each logical process starts look-ahead in response to receipt of a message permitting look-ahead, and does not send any message during simulation execution and standby even when a message is received. That is, the simulation apparatus 100 can efficiently execute logical processes in parallel while minimizing the frequency of message sending between the logical processes.

Figure 9:
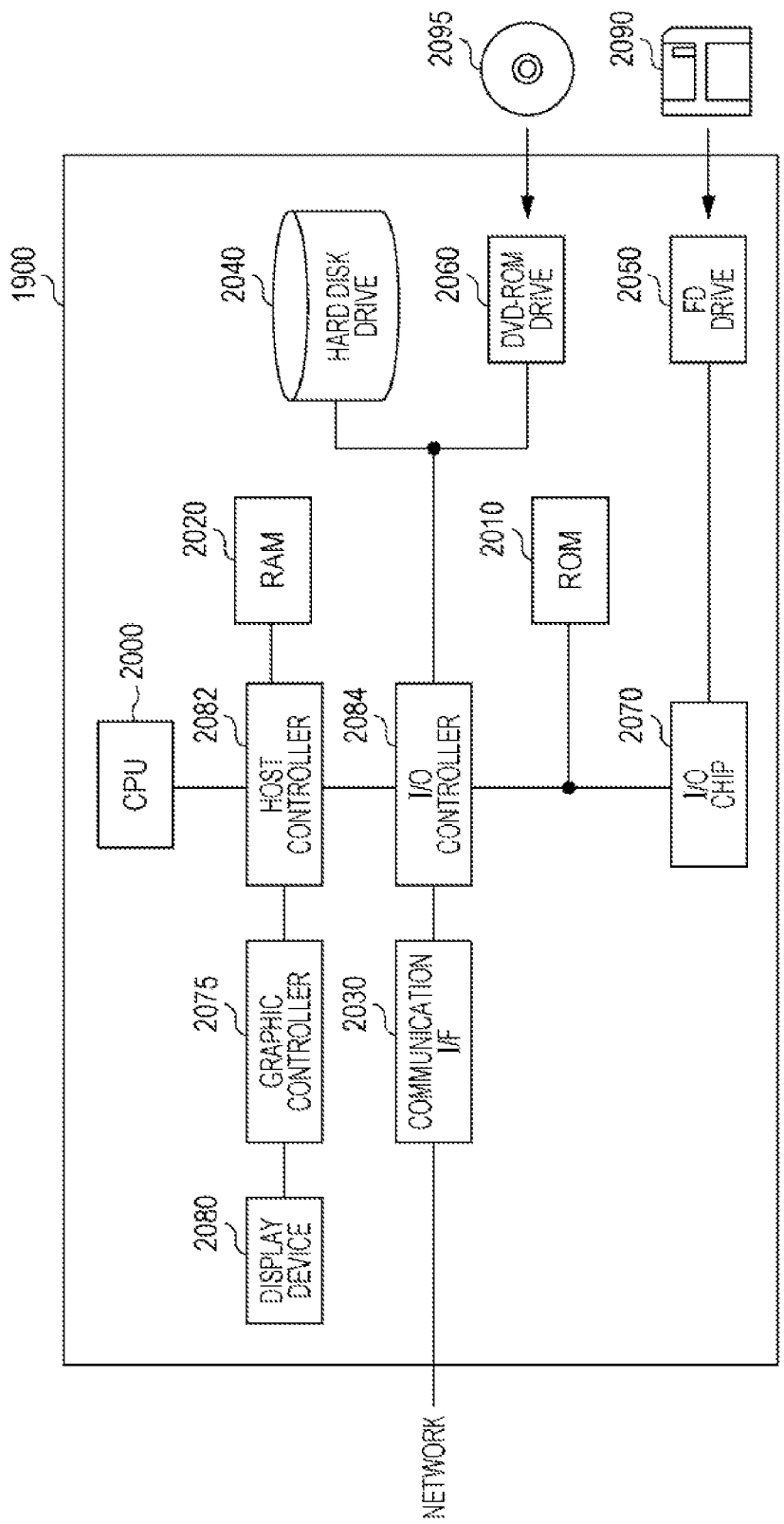
FIG. 9 illustrates a hardware configuration of a computer 1900 serving as the simulation apparatus 100 according to the embodiment.

FIG. 9 illustrates a hardware configuration of a computer 1900 serving as the simulation apparatus 100 according to the present embodiment. The computer 1900 according to the present embodiment includes a central processing unit (CPU) peripheral section having a CPU 2000, a random-access memory (RAM) 2020, a graphic controller 2075, and a display device 2080 connected to each other by a host controller 2082; an input/output (I/O) section having a communication interface (I/F) 2030, a hard disk drive 2040, and a digital versatile disc read-only memory (DVD-ROM) drive 2060 connected to the host controller 2082 by an input/output controller 2084; and a legacy input/output section having a ROM 2010, a flexible disk drive 2050, and an input/output chip 2070 connected to the input/output controller 2084.

The host controller 2082 connects the RAM 2020 to the CPU 2000 and the graphic controller 2075 that access the RAM 2020 at a high transfer rate. The CPU 2000 operates in accordance with programs stored in the ROM 2010 and the RAM 2020 to control each part. The graphic controller 2075 acquires image data generated by the CPU 2000 and the like in a frame buffer in the RAM 2020, and displays the acquired image data on the display device 2080. Alternatively, the graphic controller 2075 may include a frame buffer for storing image data generated by the CPU 2000 and the like.

The input/output controller 2084 connects the host controller 2082 to the communication interface 2030, the hard disk drive 2040, and the DVD-ROM drive 2060 which are relatively high-speed input/output devices. The communication interface 2030 communicates with other apparatuses via a network. The hard disk drive 2040 stores programs and data used by the CPU 2000 in the computer 1900. The DVD-ROM drive 2060 reads a program or data from a DVD-ROM 2095 and provides the read program or data via the RAM 2020 to the hard disk drive 2040.

The ROM 2010 and relatively low-speed input/output devices, including the flexible disk drive 2050 and the input/output chip 2070, are connected to the input/output controller 2084. The ROM 2010 stores a boot program executed by the computer 1900 at startup and/or programs dependent on the hardware of the computer 1900. The flexible disk drive 2050 reads a program or data from the flexible disk 2090 and provides the read program or data via the RAM 2020 to the hard disk drive 2040. The input/output chip 2070 connects the flexible disk drive 2050 to the input/output controller 2084. At the same time, the input/output chip 2070 connects various input/output devices to the input/output controller 2084, for example, via a parallel port, a serial port, a keyboard port, or a mouse port.

A program provided via the RAM 2020 to the hard disk drive 2040 is stored in a recording medium, such as the flexible disk 2090, the DVD-ROM 2095, or an integrated circuit (IC) card, and is provided by the user. The program is read from the recording medium, installed via the RAM 2020 onto the hard disk drive 2040 in the computer 1900, and executed by the CPU 2000.

A program is installed on the computer 1900, and causes the computer 1900 to function as the acquiring unit 110, the storage unit 120, the condition generating unit 130, the solver unit 140, the simulation unit 150, and the display unit 160.

Information processing described in the program is read by the computer 1900. Thus, the computer 1900 functions as the acquiring unit 110, the storage unit 120, the condition generating unit 130, the solver unit 140, the simulation unit 150, and the display unit 160 which are concrete units implemented through coordination between software and various hardware resources described above. When these concrete units compute or process information appropriate for the intended use of the computer 1900 according to the present embodiment, the simulation apparatus 100 appropriate for the intended use is realized.

For example, for the computer 1900 to communicate with an external device, the CPU 2000 executes a communication program loaded in the RAM 2020 and instructs the communication interface 2030 to perform communication processing on the basis of processing described in the communication program. Under the control of the CPU 2000, the communication interface 2030 reads transmit data stored in a transmit buffer area or the like in a storage device, such as the RAM 2020, the hard disk drive 2040, the flexible disk 2090, or the DVD-ROM 2095 and transmits the read data to a network, or writes receive data received from the network to a receive buffer area or the like in the storage device. As described above, the communication interface 2030 may transfer the transmit and receive data from and to the storage device via direct memory access (DMA). Alternatively, the CPU 2000 may read data from a storage device or the communication interface 2030, which is a transfer source, and write the data to the communication interface 2030 or a storage device, which is a transfer destination, so as to transfer the transmit and receive data.

The CPU 2000 reads all or necessary part of files, databases, or the like stored in the external storage device, such as the hard disk drive 2040, the DVD-ROM drive 2060 (DVD-ROM 2095), or the flexible disk drive 2050 (flexible disk 2090), into the RAM 2020 via DMA transfer or the like, and performs various types of processing on the data in the RAM 2020. Then the CPU 2000 writes the processed data back to the external storage device via DMA transfer or the like. In this processing, the RAM 2020 can be regarded as a component that temporarily holds the contents of the external storage device. Therefore, in the present embodiment, the RAM 2020, the external storage device, and the like are collectively referred to as a memory, a storage unit, or a storage device. Various types of information, such as various programs, data, tables, and databases, in the present embodiment are stored in such a storage device, and are subjected to information processing. The CPU 2000 may hold part of data in the RAM 2020 in a cache memory, and write and read data to and from the cache memory. In such a configuration, the cache memory performs part of the function of the RAM 2020. Therefore, in the present embodiment, the cache memory is also regarded as being included in the RAM 2020, memory, and/or storage device, except in cases where the cache memory is shown separately.

On data read from the RAM 2020, the CPU 2000 performs various types of processing specified by a sequence of instructions of the program, including various computations, information processing, conditional judgment, and information retrieval and replacement described in the present embodiment, and writes the processed data back to the RAM 2020. For example, in conditional judgment, the CPU 2000 determines whether each of various variables shown in the present embodiment satisfies a condition, such as whether the variable is larger, smaller, equal to or larger, or equal to or smaller than other variables or constants. If the condition is satisfied (or not satisfied), branching to another sequence of instructions takes place, or a subroutine is called.

The CPU 2000 is capable of searching for information stored in a file or a database in a storage device. For example, when the storage device stores multiple entries in which attribute values of a first attribute are associated with respective attribute values of a second attribute, the CPU 2000 searches the multiple entries stored in the storage device for an entry having an attribute value of the first attribute that matches a specified condition, and reads an attribute value of the second attribute stored in this entry. Thus, the CPU 2000 can obtain the attribute value of the second attribute associated with the first attribute that satisfies a predetermined condition.

The above-described programs or modules may be stored in an external recording medium. Besides the flexible disk 2090 and the DVD-ROM 2095, an optical recording medium such as a DVD (digital video disk), a Blu-ray (Note: the term(s) "BLU-RAY" may be subject to trademark rights in various jurisdictions throughout the world and are used here only in reference to the products or services properly denominated by the marks to the extent that such trademark rights may exist) disc, or a compact disc (CD), a magneto-optical recording medium such as a magneto-optical (MO) disk, a tape medium, and a semiconductor memory such as an IC card may be used as a recording medium. A storage device, such as a hard disk or a RAM, in a server system connected to a dedicated communication network or the Internet may be used as a recording medium, and the programs may be provided to the computer 1900 via the network.

Although the present invention has been described using the embodiments, the technical scope of the present invention is not limited to the scope described in the embodiments. It is apparent to those skilled in the art that various modifications and improvements can be made to the embodiments described above. It is apparent from the description of the claims that such modified or improved embodiments may also be included in the technical scope of the present invention.

The order of execution of each processing in operations, procedures, steps, stages, and the like of the apparatus, system, program, and method described in the claims, description, and drawings is not particularly stated with such phrases as "before" and "prior to." It should be noted that the processing may be implemented in any order unless the output of previous processing is used in subsequent processing. Although phrases such as "first" and "next" may be used in the claims, the description, and the operation flow in the drawing, this does not mean that it is essential to implement the processing in this order.

The following reference numerals are used in the Figures: 100 simulation apparatus, 110 acquiring unit, 120 storage unit, 130 condition generating unit, 140 solver unit, 150 simulation unit, 160 display unit, 1900 computer, 2000 CPU, 2010 ROM, 2020 RAM, 2030 communication interface, 2040 hard disk drive, 2050 flexible disk drive, 2060 DVD-ROM drive, 2070 input/output chip, 2075 graphic controller, 2080 display device, 2082 host controller, 2084 input/output controller, 2090 flexible disk, 2095 DVD-ROM.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

What is claimed is:

1. A simulation apparatus for performing parallel execution of multiple logical processes obtained by modeling a plurality of components included in a system to be simulated, the simulation apparatus comprising:
    a condition generating unit configured to generate, on the basis of communication delays between the multiple logical processes: (i) constraint conditions to be satisfied by initial time shifts given to the multiple logical processes, and (ii) look-ahead times, with each look-ahead time corresponding to a time interval to be permitted for look-ahead processing by a message sent from a logical process serving as a communication source to a logical process serving as a communication destination; and
    a solver unit configured to: (i) solve an optimization problem satisfying the constraint conditions and minimizing overhead in communication of messages between the multiple logical processes, (ii) obtain the initial time shifts of the multiple logical processes and (iii) obtain the look-ahead times between the multiple logical processes.

2. The simulation apparatus according to claim 1, further comprising a simulation unit configured to: (i) start each of the multiple logical processes after the initial time shift, and (ii) execute the multiple logical processes in parallel while causing each logical process to send a message permitting look-ahead during the look-ahead time.

3. The simulation apparatus according to claim 2, wherein the simulation unit advances execution of each logical process until the end of the shortest of the look-ahead times permitted by the messages sent to the logical process, and causes the logical process to send messages to other logical processes.

4. The simulation apparatus according to claim 1, wherein the solver unit solves a maximization problem satisfying the constraint conditions and maximizing a sum of the look-ahead times in the multiple logical processes.

5. The simulation apparatus according to claim 1, wherein the condition generating unit generates the constraint conditions where the look-ahead time to be permitted by a message from each logical process serving as a communication source to each logical process serving as a communication destination is shorter than or equal to the communication delay in communication from the logical process serving as a communication source to the logical process serving as a communication destination.

6. The simulation apparatus according to claim 5, wherein on condition that one logical process does not directly communicate with another logical process, the condition generating unit does not set an upper limit on the look-ahead time permitted by a message from the one logical process to the other logical process.

7. The simulation apparatus according to claim 1, wherein the condition generating unit generates a constraint condition where, between logical processes communicating with each other among the multiple logical processes, a difference between initial time shifts of a first logical process and a second logical process is set to a value obtained by bringing a difference between a look-ahead time permitted by a message from the second logical process to the first logical process and a look-ahead time permitted by a message from the first logical process to the second logical process close to 0.

8. The simulation apparatus according to claim 7, wherein the condition generating unit generates a constraint condition where, between logical processes communicating with each other among the multiple logical processes, the difference between the initial time shifts of the first logical process and the second logical process is set to be in the range from one-fourth to three-fourths of the difference between the look-ahead time permitted by a message from the second logical process to the first logical process and the look-ahead time permitted by a message from the first logical process to the second logical process.

9. The simulation apparatus according to claim 8, wherein the condition generating unit generates a constraint condition where, between logical processes communicating with each other among the multiple logical processes, the difference between the initial time shifts of the first logical process and the second logical process is half the difference between the look-ahead time permitted by a message from the second logical process to the first logical process and the look-ahead time permitted by a message from the first logical process to the second logical process.

10. A simulation method for performing parallel execution of multiple logical processes obtained by modeling a plurality of components included in a system to be simulated, the simulation method comprising:
  generating, on the basis of communication delays between the multiple logical processes: (i) constraint conditions to be satisfied by initial time shifts given to the multiple logical processes, and (ii) look-ahead times, with each look-ahead time corresponding to a time interval to be permitted for look-ahead processing by a message sent from a logical process serving as a communication source to a logical process serving as a communication destination;
  solving an optimization problem satisfying the constraint conditions and minimizing overhead in communication of messages between the multiple logical processes;
  obtaining the initial time shifts of the multiple logical processes; and
  obtaining the look-ahead times between the multiple logical processes.

11. A computer program product for performing parallel execution of multiple logical processes obtained by modeling a plurality of components included in a system to be simulated, the computer program product comprising a non-transitory computer readable storage medium having stored thereon:
  first program instructions programmed to generate, on the basis of communication delays between the multiple logical processes: (i) constraint conditions to be satisfied by initial time shifts given to the multiple logical processes, and (ii) look-ahead times, with each look-ahead time corresponding to a time interval to be permitted for look-ahead processing by a message sent from a logical process serving as a communication source to a logical process serving as a communication destination;
  second program instructions programmed to solve an optimization problem satisfying the constraint conditions and minimizing overhead in communication of messages between the multiple logical processes;
  third program instructions programmed to obtain the initial time shifts of the multiple logical processes; and
  fourth program instructions programmed to obtain the look-ahead times between the multiple logical processes.

* * * * *